US012297123B2

(12) United States Patent
Fukazawa et al.

(10) Patent No.: US 12,297,123 B2
(45) Date of Patent: May 13, 2025

(54) NEGATIVE THERMAL EXPANSION MATERIAL, METHOD FOR PRODUCING THE SAME, AND COMPOSITE MATERIAL

(71) Applicant: NIPPON CHEMICAL INDUSTRIAL CO., LTD., Tokyo (JP)

(72) Inventors: Junya Fukazawa, Tokyo (JP); Takuma Kato, Tokyo (JP); Toru Hata, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 18/837,926

(22) PCT Filed: Feb. 24, 2023

(86) PCT No.: PCT/JP2023/006751
§ 371 (c)(1),
(2) Date: Aug. 13, 2024

(87) PCT Pub. No.: WO2023/181781
PCT Pub. Date: Sep. 28, 2023

(65) Prior Publication Data
US 2025/0109032 A1    Apr. 3, 2025

(30) Foreign Application Priority Data

Mar. 23, 2022 (JP) ................. 2022-047577
May 16, 2022 (JP) ................. 2022-080257
Oct. 6, 2022 (JP) ................. 2022-161761

(51) Int. Cl.
C04B 35/495    (2006.01)
C01G 31/00    (2006.01)
C04B 35/626    (2006.01)

(52) U.S. Cl.
CPC ........ *C01G 31/006* (2013.01); *C01P 2002/52* (2013.01); *C01P 2002/72* (2013.01);
(Continued)

(58) Field of Classification Search
CPC ........................ C01G 31/006; C01P 2002/52
See application file for complete search history.

(56) References Cited

FOREIGN PATENT DOCUMENTS

CN        105648248 A    6/2016
CN        112390642 B    1/2023
(Continued)

OTHER PUBLICATIONS

Zhang et al., "Tailored thermal expansion and electrical properties of α-Cu₂V₂O₇/Al", Ceramics International, 2016, 42, pp. 17004-17008, cited in Specification, ISR, JP Notice of Reasons for Refusal and Decision to Grant a Patent (5 pages).
(Continued)

*Primary Examiner* — Bryan D. Ripa
*Assistant Examiner* — Cameron K Miller
(74) *Attorney, Agent, or Firm* — WHDA, LLP

(57) ABSTRACT

An object of the present invention is to provide a negative thermal expansion material having better negative thermal expansion characteristics. The present invention is a negative thermal expansion material, comprising copper vanadium composite oxide powder dissolving Al atoms and represented by the following general formula (1), $Cu_xM_yV_zO_t$ (1). In general formula (1), M represents a metallic element with an atomic number of 11 or more other than Cu, V, and Al, $1.60 \leq x \leq 2.40$, $0.00 \leq y \leq 0.40$, $1.70 \leq z \leq 2.30$, $6.00 \leq t \leq 9.00$, $1.00 \leq x+y \leq 3.00$, and a molar number of the Al atoms in terms of atoms>a molar number of M atoms in terms of atoms if an M element is contained.

12 Claims, 3 Drawing Sheets

(52) U.S. Cl.
CPC ...... *C01P 2004/03* (2013.01); *C01P 2004/32* (2013.01); *C01P 2004/61* (2013.01); *C01P 2004/62* (2013.01); *C01P 2006/12* (2013.01); *C01P 2006/32* (2013.01)

(56) References Cited

FOREIGN PATENT DOCUMENTS

| | | |
|---|---|---|
| JP | 2005-35840 A | 2/2005 |
| JP | 2015-10006 A | 1/2015 |
| JP | 2018-2577 A | 1/2018 |
| JP | 2019-210198 A | 12/2019 |
| WO | 2020/095518 A1 | 5/2020 |
| WO | 2020/148886 A1 | 7/2020 |

OTHER PUBLICATIONS

International Search Report dated May 16, 2023, issued in counterpart International Application No. PCT/JP2023/006751 (2 pages).
Notice of Reasons for Refusal dated Sep. 26, 2023, issued in counterpart JP Patent Application No. 2022-161761, w/English translation (6 pages).
Decision to Grant a Patent dated Dec. 12, 2023, issued in counterpart JP Patent Application No. 2022-161761, w/English translation (5 pages).

NEGATIVE THERMAL EXPANSION MATERIAL, METHOD FOR PRODUCING THE SAME, AND COMPOSITE MATERIAL

TECHNICAL FIELD

The present invention relates to a negative thermal expansion material, which contracts with an increase in temperature, a method for producing the negative thermal expansion material, and a composite material containing the negative thermal expansion material.

If the temperature rises, many substances increase in length or volume due to thermal expansion. Meanwhile, materials that contract upon heating and exhibit negative thermal expansion (hereinafter occasionally referred to as "negative thermal expansion materials") are also known.

It is known that the use of materials exhibiting negative thermal expansion with other materials enables suppressing the thermal expansion change of the materials with temperature variation.

As materials exhibiting negative thermal expansion, for example, β-eucryptite, zirconium tungstate ($ZrW_2O_8$), zirconium phosphate tungstate ($Zr_2WO_4(PO_4)_2$), $Zn_xCd_{1-x}(CN)_2$, manganese nitride, and bismuth-nickel-iron oxide are known.

It is known that the linear coefficient of expansion of zirconium phosphate tungstate is −3.4 to −3.0 ppm/° C. in the temperature range of 0 to 400° C., and zirconium phosphate tungstate is high in negative thermal expandability. The combined use of the zirconium phosphate tungstate and a material exhibiting positive thermal expansion (hereinafter occasionally referred to as a "positive thermal expansion material") enables producing a low thermal expansion material (for example, refer to Patent Literatures 1 and 2). The combined use of a polymer such as a resin that is a positive thermal expansion material and a negative thermal expansion material has been proposed (for example, refer to Patent Literature 3).

The following Non Patent Literature 1 discloses that a copper vanadium composite oxide, $\alpha\text{-}Cu_2V_2O_7$, has a linear coefficient of expansion of −5 to −6 ppm/° C. in the range of room temperature to 200° C. Methods for further improving negative thermal expansion characteristics by partially substituting the Cu atoms of the copper vanadium composite oxide with atoms of at least one element selected from Zn, Ga, and Fe or by partially substituting the V atoms with P atoms have also been proposed (Patent Literatures 4 to 5).

Patent Literature 6 described below discloses a negative thermal expansion material represented by the general formula:

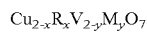

$Cu_{2-x}R_xV_{2-y}M_yO_7$ wherein R is at least one element selected from Zn, Ga, Fe, Sn, and Mn, M is at least one element selected from Mg, Si, Al, Ti, Cr, Mn, Fe, Co, Ni, and Sn, 0≤x<2, and 0<y<2.

However, the negative thermal expansion materials containing M elements that are actually implemented in Patent Literature 6 are only those of containing Si and Mn as M elements. Therefore, the exemplification of Al as an M element in Patent Literature 6 is based on no technical evidence.

CITATION LIST

Patent Literature

Patent Literature 1
Japanese Patent Laid Open No. 2005-35840
Patent Literature 2
Japanese Patent Laid Open No. 2015-10006
Patent Literature 3
Japanese Patent Laid Open No. 2018-2577
Patent Literature 4
Japanese Patent Laid Open No. 2019-210198
Patent Literature 5
Chinese Patent No. CN112390642
Patent Literature 6
International Publication No. WO 2020/095518

Non Patent Literature

Non Patent Literature 1
Ceramics International, Vol. 42, p 17004-17008(2016)

SUMMARY OF INVENTION

Technical Problem

Since the copper vanadium composite oxide of Non Patent Literature 1 may have a low linear coefficient of expansion as compared with zirconium phosphate tungstate, can be produced from lower-price raw materials and industrially advantageously produced, and is better in water resistance, the copper vanadium composite oxide is also required to have further improved negative thermal expansion characteristics.

Accordingly, an object of the present invention is to provide a negative thermal expansion material having better negative thermal expansion characteristics. Another object of the present invention is to provide the negative thermal expansion material by an industrially advantageous method.

Solution to Problem

The following present invention solves the above-mentioned problem.

That is, the present invention (1) provides a negative thermal expansion material characterized by comprising copper vanadium composite oxide powder dissolving Al atoms and represented by the following general formula (1):

$$Cu_xM_yV_zO_t \qquad (1)$$

wherein M represents a metallic element with an atomic number of 11 or more other than Cu, V, and Al, 1.60≤x≤2.40, 0.00≤y≤0.40, 1.70≤z≤2.30, 6.00≤t≤9.00, 1.00≤x+y≤3.00, and a molar number of the Al atoms in terms of atoms>a molar number of M atoms in terms of atoms if an M element is contained.

Advantageous Effects of Invention

According to the present invention, a negative thermal expansion material having better negative thermal expansion characteristics can be provided.

DESCRIPTION OF EMBODIMENTS

Figure 1:
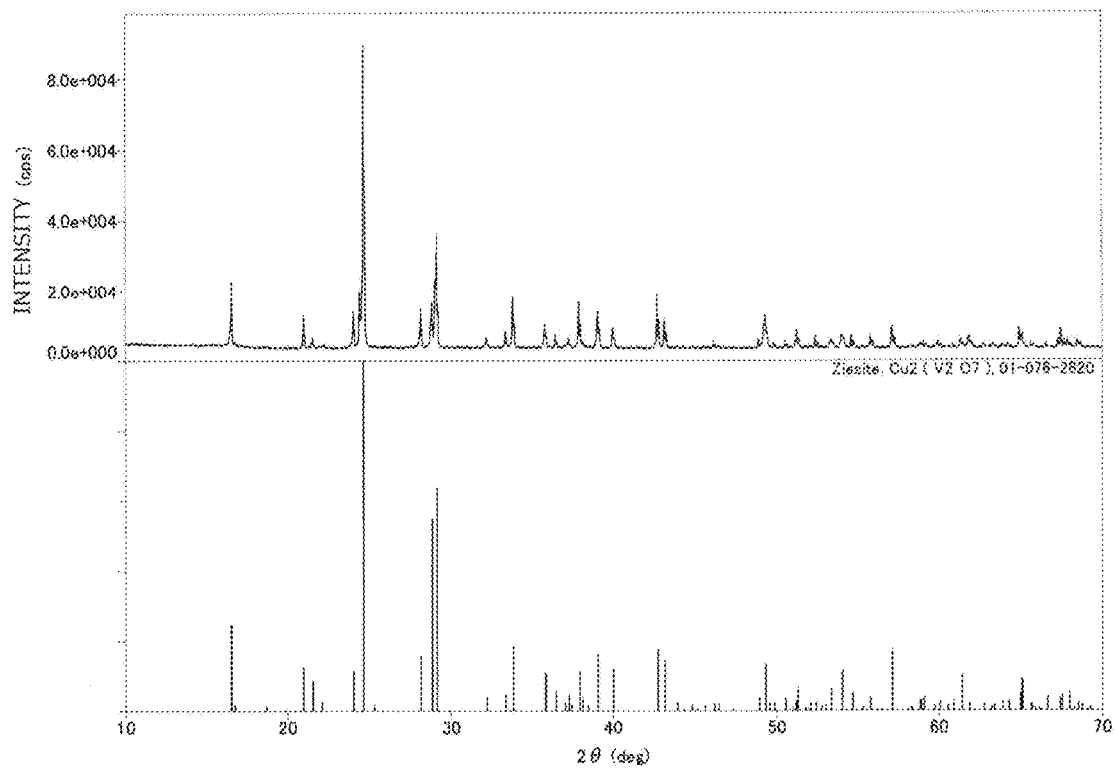
FIG. 1 is the X-ray diffraction pattern of a negative thermal expansion material sample obtained in Example 1.

Hereinafter, the present invention will be described based on preferable embodiments thereof.

A negative thermal expansion material of the present invention is characterized by comprising copper vanadium composite oxide powder dissolving Al atoms and represented by the following general formula (1):

$$Cu_xM_yV_zO_t \quad (1)$$

wherein M represents a metallic element with an atomic number of 11 or more other than Cu, V, and Al, $1.60 \leq x \leq 2.40$, $0.00 \leq y \leq 0.40$, $1.70 \leq z \leq 2.30$, $6.00 \leq t \leq 9.00$, $1.00 \leq x+y \leq 3.00$, and a molar number of the Al atoms in terms of atoms>a molar number of M atoms in terms of atoms if an M element is contained.

The copper vanadium composite oxide dissolving and incorporating Al atoms is a copper vanadium composite oxide represented by the following general formula (1):

$$Cu_xM_yV_zO_t \quad (1)$$

In the general formula (1), M is a metallic element to be incorporated as needed for improving the negative thermal expandability, adjusting the negative thermal characteristics, and improving the dispersibility in resin. M represents a metallic element with an atomic number of 11 or more other than Cu, V, and Al, and is preferably one or more selected from Zn, Ga, Fe, Mg, Co, Mn, Ba, and Ca; and particularly preferably Ca from the viewpoint that the negative thermal expansion material has better negative thermal expansion characteristics.

In the general formula (1), $1.60 \leq x \leq 2.40$, and preferably $1.70 \leq x \leq 2.30$. If x is in the above-mentioned range, the negative thermal expansion characteristics are further enhanced.

In the general formula (1), $0.00 \leq y \leq 0.40$, and preferably $0.00 \leq y \leq 0.35$. If y is in the above-mentioned range, the negative thermal expansion characteristics are further enhanced.

In the general formula (1), $1.70 \leq z \leq 2.30$, and preferably $1.80 \leq z \leq 2.20$. If z is in the above-mentioned range, the negative thermal expansion characteristics are further enhanced.

In the general formula (1), $6.00 \leq t \leq 9.00$, and preferably $6.00 \leq t \leq 8.00$. If t is in the above-mentioned range, the negative thermal expansion characteristics are further enhanced.

In the general formula (1), $1.00 \leq x+y \leq 3.00$, and preferably $1.50 \leq x+y \leq 2.50$. If x+y is in the above-mentioned range, the negative thermal expansion characteristics are further enhanced.

In the general formula (1), the molar number of the Al atoms in terms of atoms>the molar number of the M atoms in terms of atoms if the M element is contained.

In the negative thermal expansion material of the present invention, the Al atoms are dissolved in the copper vanadium composite oxide represented by the general formula (1). That is, the negative thermal expansion material of the present invention comprises the copper vanadium composite oxide represented by the general formula (1), and the Al atoms are dissolved and incorporated inside of the particles of the copper vanadium composite oxide. In a common complex of a negative thermal expansion material and Al metal, the Al metal merely adheres to negative thermal expansion material particles strongly unlike the present invention wherein the Al atoms are dissolved inside of the particles of the negative thermal expansion material.

Since the negative thermal expansion material of the present invention is the copper vanadium composite oxide powder dissolving the Al atoms and represented by the general formula (1), the negative thermal expansion characteristics are improved as compared with copper vanadium composite oxide powder not dissolving and incorporating Al atoms and having the same composition as represented by the general formula (1). That is, since the negative thermal expansion material of the present invention is the copper vanadium composite oxide powder dissolving the Al atoms and represented by the general formula (1), the coefficient of thermal expansion is reduced as compared with the copper vanadium composite oxide powder not dissolving and incorporating the Al atoms and having the same composition as represented by the general formula (1).

The content of the Al atoms in the negative thermal expansion material of the present invention is preferably 100 to 30000 ppm by mass, more preferably 500 to 28000 ppm by mass, and particularly preferably 1000 to 26000 ppm by mass, if the content of the Al atoms in the negative thermal expansion material is in the above-mentioned range, the negative thermal expansion material is preferable in that the negative thermal expansion material is a single phase confirmed by X-ray diffraction, and is better in negative thermal expansion characteristics. In the present invention, a solution prepared by acidolyzing the negative thermal expansion material is analyzed by the ICP emission method to determine the content of the Al atoms in the negative thermal expansion material.

The BET specific surface area of the negative thermal expansion material of the present invention is, but not particularly limited to, preferably 0.05 to 50 m²/g, particularly preferably 0.1 to 10 m²/g, and still more preferably 0.1 to 5 m²/g. If the negative thermal expansion material is used as a filler for resin or glass, the BET specific surface area of the negative thermal expansion material in the above-mentioned range facilitates the handle thereof.

The average particle size of the negative thermal expansion material of the present invention is determined by scanning electron microscopy observation, and is, but not particularly limited to, preferably 0.1 to 100 μm and particularly preferably 0.3 to 80 μm. If the negative thermal expansion material is used as a filler for resin or glass, the average particle size of the negative thermal expansion material in the above-mentioned range facilitates the handle thereof. In the present invention, the arithmetic mean value of the sizes of 50 particles randomly sampled in the scanning electron microscopy observation at a magnification of 1000 was calculated as the average particle size of the negative thermal expansion material. At this time, the particle size of each particle means the length of the longest segment (the maximum length) among the line segments passing across a two-dimensional projection image of the particle.

The particle shape of the negative thermal expansion material of the present invention may be, but not particularly limited to, for example, spherical, granular, plate-like, scaly, whisker-like, rod-like, filamentous, or a crushed shape. However, the negative thermal expansion material still preferably contains many spherical particles from the viewpoint of enabling suppressing the production of particulates by chipping during the mixing of the negative thermal expansion material with the positive thermal expansion material and mixing thereof more uniformly.

The spherical particles in the present invention does not have to be necessarily true spherical particles, and means particles with sphericities of 0.70 or more and 1.00 or less.

A specimen is observed at a magnification of 100 to 1000 through an electron microscope, followed by image-analysis processing to obtain parameters. The sphericity in the present invention is calculated from the obtained parameters in accordance with the following calculation expression (1):

$$\text{Sphericity} = \text{diameter equivalent to diameter of circle with equal area}/\text{circumscribed circle diameter} \quad (1)$$

wherein the diameter equivalent to the diameter of the circle with equal area refers to the diameter of a circle having a circumference that is equivalent to the perimeter of a particle. The circumscribed circle diameter refers to the longest diameter of the particle.

The content of the spherical particles with sphericities of 0.70 or more and 1.00 or less in the negative thermal expansion material of the present invention is preferably 75% or more and particularly preferably 80% or more based on the number. The content of the spherical particles with sphericities of 0.70 or more and 1.00 or less in the negative thermal expansion material in the above-mentioned range suppresses the production of particulates by chipping during the mixing of the negative thermal expansion material with the positive thermal expansion material. Such a content also makes the negative thermal expansion material better in terms of dispersibility in the positive thermal expansion material and filling characteristics.

In the present invention, the content of spherical particles with sphericities of 0.70 or more and 1.00 or less means the content ratio (percent) based on the number of the spherical particles with sphericities of 0.70 or more and 1.00 or less calculated in accordance with the above-mentioned calculation expression (1) in the randomly sampled 50 particles by observing specimen with an electron microscope at a magnification of 100 to 1000 and image-analysis processing.

Examples of the image analyzer for the image-analysis processing include LUZEX (available from NIRECO CORPORATION) and PITA-04 (available from SEISHIN ENTERPRISE Co., Ltd.). As the sphericity becomes more approximate to 1, the particle becomes more similar to a true spherical particle.

As long as the negative thermal expansion material of the present invention has a low coefficient of thermal expansion as compared with that of the copper vanadium composite oxide powder not dissolving and incorporating Al atoms and having the same composition as represented by the general formula (1), the coefficient of thermal expansion of the negative thermal expansion material of the present invention is, but not limited to, preferably $-10\times10^{-6}/K$ or less, more preferably $-12\times10^{-6}/K$ or less, and still more preferably $-15\times10^{-6}/K$ or less, and the lower limit is, but not particularly limited to, around $-40\times10^{-6}/K$ or more and preferably $-37\times10^{-6}/K$ or more. The coefficient of thermal expansion of the negative thermal expansion material of the present invention is particularly preferably $-35\times10^{-6}/K$ to $-13\times10^{-6}/K$ in that the coefficient of thermal expansion easily offsets the positive expansion upon the combination of the negative thermal expansion material of the present invention with the positive thermal expansion material.

In the present invention, the coefficient of thermal expansion is determined by the following procedure. First, 1.0 g of the negative thermal expansion material sample is mixed with 0.05 g of a binder resin, and the entire amount thereof is filled into a metal mold with a diameter of 6 mm and subsequently molded with a hand press under a pressure of 0.5 t to manufacture a molding. This molding is fired at 700° C. in the atmosphere in an electric furnace for 4 hours to obtain a ceramic molding. The obtained ceramic molding is repeatedly measured twice with a thermomechanical measuring apparatus in a nitrogen atmosphere under a load of 10 g at a temperature range of 50 to 425° C. The coefficient of thermal expansion at 50 to 400° C. in the second measurement is defined as the coefficient of thermal expansion. As the thermomechanical measuring apparatus, for example, TMA400SE available from NETZSCH Japan K.K. is usable.

In the negative thermal expansion material of the present invention, the copper vanadium composite oxide represented by the general formula (1) basically includes the ziesite phase (β-phase) and the blossite phase (α-phase), and also includes a mixed phase thereof. The negative thermal expansion material of the present invention may be the ziesite phase (β-phase), the blossite phase (α-phase) or the mixed phase of the ziesite phase (β-phase) and the blossite phase (α-phase). The negative thermal expansion material of the present invention is preferably a single phase of the ziesite phase (β-phase) or in a mixed phase wherein the main peak at around 2θ=25° derived from the ziesite phase (β-phase), is higher than the main peak at around 2θ=27° derived from the blossite phase (α-phase), upon the X-ray diffraction analysis thereof, and the ziesite phase (β-phase) is contained in a larger amount from the viewpoint that the negative thermal expansion material is better in terms of negative thermal expandability.

In the present invention, "copper vanadium composite oxide represented by the general formula (1) is single-phase" means that the ziesite phase (β-phase) of the copper vanadium composite oxide represented by the general formula (1) is present alone, the blossite phase (α-phase) is present alone, or the ziesite phase (β-phase) and the blossite phase (α-phase) are present as a mixed phase, and means that other diffraction peaks than the diffraction peaks derived from the copper vanadium composite oxide represented by the general formula (1) are not detected by X-ray diffraction.

In the present invention, the phrase "around 2θ=25°" means that 2θ=23.5 to 26.5°. The phrase "around 2θ=27°" means that 2θ=26.8 to 27.8°.

In the negative thermal expansion material of the present invention, upon the X-ray diffraction analysis of the negative thermal expansion material using CuKα line as a radiation source, diffraction peaks at around 2θ=25° are derived from the ziesite phase (β-phase), and diffraction peaks at around 2θ=27° are derived from the blossite phase (α-phase).

The method for producing the negative thermal expansion material of the present invention is not particularly limited, but the negative thermal expansion material is industrially advantageously produced by the following first and second steps.

A method for producing a negative thermal expansion material of the present invention is characterized by comprising:

the first step of mixing an Al source, a Cu source, and a V source; and an M source to be added as needed to prepare a raw material mixture and the second step of firing the raw material mixture to obtain a negative thermal expansion material.

The first step is a step of mixing an Al source, a Cu source, and a V source; and an M source to be added as needed to prepare a raw material mixture.

Examples of the Al source related to the first step include oxide and hydroxide of aluminum, aluminum nitrate, aluminum sulfate, aluminum biphosphate, aluminum chloride, and aluminum lactate.

Examples of the Cu source related to the first step include copper salts of organic carboxylic acids such as copper gluconate, copper citrate, copper acetate, and copper lactate; copper salts of mineral acids; copper oxides; and copper hydroxides.

Examples of the V source related to the first step include vanadic acid and sodium salt, potassium salt, and ammonium salt thereof; carboxylates; and vanadium oxides such as vanadium pentoxide. Examples of vanadium salts of carboxylic acids include monocarboxylates such as formate, acetate, glycolate, lactate, and gluconate; dicarboxylates such as oxalate, maleate, malonate, malate, tartrate, and succinate; and carboxylates having three carboxyl groups such as citrate.

Examples of the M source to be mixed as needed related to the first step include carboxylates, halides, oxide, and hydroxide of the M source. Examples of the carboxylates of the M source include gluconates, citrates, and lactates.

In the preparation of the raw material mixture related to the first step, the mixing amounts of the Cu source and the V source; and the M source to be added as needed are preferably adjusted suitably so that the molar ratio between the Cu atoms, the V atoms, and the M atoms in the raw material mixture corresponds to the composition of the copper vanadium composite oxide represented by the above-mentioned general formula (1). In the preparation of the raw material mixture related to the first step, the mixing amount of the Al source is preferably adjusted suitably to preferably 100 to 30000 ppm by mass, more preferably 500 to 28000 ppm by mass, and particularly preferably 1000 to 26000 ppm by mass based on the obtained negative thermal expansion material.

Although, in the first step, the Al source, the Cu source, and the V source; and the M source to be added as needed can be mixed by the wet process or the dry process, the sources are preferably mixed by the wet process in that the wet process enables obtaining a homogeneous raw material mixture easily.

Although the solvent for the wet mixing varies depending on the types of the Al source, the Cu source, and the V source; and the M source to be added as needed, examples of the solvent include water, methanol, and ethanol.

If the Al source, the Cu source, and the V source; and the M source to be added as needed are insoluble or sparingly soluble, the average particle sizes (D50) of the Al source, the Cu source, and the V source; and the M source to be added as needed based on the determination by laser diffraction is preferably 50 µm or less and particularly preferably 0.1 to 40 µm in that the reactivity is enhanced.

As long as slurry in which the raw materials are uniformly dispersed is obtained, the apparatus for wet-mixing the Al source, the Cu source, and the V source; and the M source to be added as needed that are insoluble or sparingly soluble is not particularly limited. In the preparation of the slurry, the slurry can be wet-pulverized with a media mill as needed. Examples of the media mill include media mills such as bead mills, ball mills, paint shakers, attritors, and sand mills. Small amounts of raw materials may be wet-mixed with a mortar in a laboratory.

A dispersant may be mixed into the slurry from the viewpoint of still more efficient wet mixing. Examples of the dispersant to be mixed into the slurry include various surfactants and an ammonium salt of polycarboxylic acid. The concentration of the dispersant in the slurry is preferably 0.01 to 10% by mass and particularly preferably 0.1 to 5% by mass in that the dispersive effect is enhanced.

After the wet mixing, the entire amount is dried, and the solvent is removed to obtain the raw material mixture.

In the first step, the Al source, the Cu source, and the V source; and the M source to be added as needed can also be dissolved in the water solvent, followed by the removal of the water solvent therefrom to obtain the raw material mixture. In this case, the Al source, the Cu source, and the V source; and the M source to be added as needed that are soluble in the water solvent only have to be used. Examples of the Al source soluble in the water solvent include aluminum nitrate, aluminum sulfate, aluminum biphosphate, aluminum chloride, and aluminum lactate. Examples of the Cu source include copper salts of organic carboxylates and copper salts of mineral acids. Examples of the V source soluble in the water solvent include vanadic acid and sodium salts, potassium salts, and ammonium salts thereof and carboxylates.

If a vanadium salt of a carboxylic acid is used as the V source in the first step, vanadium pentoxide, a reducing agent, and a carboxylic acid are added to the water solvent, and the mixture is heat-treated at 60 to 100° C. to produce a vanadium salt of the carboxylic acid. This reaction solution is used as it is, and the Cu source and the Al source; and the M source to be added as needed are mixed to obtain the raw material-mixed solution containing the Cu source, the Al source, and the V source; and the M source to be added as needed. The water solvent may be then removed from the raw material-mixed solution to prepare the raw material mixture.

The reducing agent is preferably a reducing sugar. Examples of the reducing sugar include glucose, fructose, lactose, maltose, and sucrose. Among these, lactose and sucrose are particularly preferable from the viewpoint that lactose and sucrose are highly reactive. The amount of the reducing sugar added is preferably 0.7 to 3.0 and more preferably 0.8 to 2.0 in terms of the molar ratio of C in the reducing sugar to V in vanadium pentoxide (C/V) in that the reductive reaction can be performed efficiently. The amount of the carboxylic acid added is preferably 0.1 to 4.0 and more preferably 0.2 to 3.0 in terms of the molar ratio of the carboxylic acid to vanadium pentoxide in that a transparent vanadium solution can be obtained efficiently.

In the first step, the entire amount of the mixture is dried after the wet mixing for removing the solvent to obtain the copper vanadium composite oxide represented by the above-mentioned general formula (1). The composition of the obtained copper vanadium composite oxide roughly corresponds with the molar ratio of the Al atoms to the Cu atoms to the V atoms to the M atoms in the Al source, the Cu source, and the V source; and the M source to be added as needed upon feeding the raw materials.

The second step is a step of firing the raw material mixture prepared in the first step to obtain the negative thermal expansion material of the present invention.

The firing temperature in the second step is preferably 580 to 780° C. and more preferably 600 to 750° C. Meanwhile, if the firing temperature in the second step is below the above-mentioned range, the copper vanadium composite oxide represented by the above-mentioned general formula (1) tends to be insufficiently produced. If the firing temperature in the second step is above the above-mentioned range, the molten product sticking to the crucible tends to make it difficult to collect the product. The firing time in the second step is not particularly limited, but the mixture is fired for sufficient time until the negative thermal expansion material of the present invention is produced.

The firing time in the second step is not particularly limited, but the mixture is fired for sufficient time until the negative thermal expansion material of the present invention is produced. The production of the negative thermal expansion material of the present invention can be confirmed for example, by analyzing whether a single-phase copper vanadium composite oxide represented by the general formula (1) is obtained by X-ray diffraction. In the second step, almost entire of the raw material mixture usually becomes the negative thermal expansion material dissolving the Al atoms and comprising the copper vanadium composite oxide represented by the above-mentioned general formula (1) within a firing time of 1 hour or more, preferably 2 to 20 hours. In the present invention, "copper vanadium composite oxide represented by the general formula (1) is single phase" means that the ziesite phase ($\beta$-phase) of the copper vanadium composite oxide represented by the general formula (1) is present alone, the blossite phase ($\alpha$-phase) is present alone, or the ziesite phase ($\beta$-phase) and the blossite phase ($\alpha$-phase) are present as a mixed phase, and means that other diffraction peaks than the diffraction peaks derived from the copper vanadium composite oxide represented by the general formula (1) are not detected by X-ray diffraction.

The firing atmosphere in the second step is not particularly limited, and the second step may be performed in any of an inert gas atmosphere, a vacuum atmosphere, an oxidizing gas atmosphere, and the atmosphere.

In the second step, the raw material mixture may be fired once or multiple times if desired. For example, the object fired once may be pulverized, and the pulverized object may be further fired for uniforming the powder characteristics.

After the firing, the fired object is suitably cooled; and pulverized, disintegrated, and classified as needed to obtain the negative thermal expansion material of the present invention.

Examples of the method for producing the negative thermal expansion material with a spherical particle shape include a method involving drying the entire amount of the slurry after the wet mixing by spray drying using a spray dryer in the first step, followed by the second step to produce the negative thermal expansion material containing spherical particles with a sphericity of 0.70 or more and 1.00 or less at a content of 75% or more, preferably 80% or more based on the number.

In the spray drying, the size of the sprayed droplets is not particularly limited, but preferably 1 to 40 µm and particularly preferably 5 to 30 µm. The amount of the slurry fed to the spray dryer is preferably determined in light of this viewpoint.

The temperature of hot air for drying from the spray dryer is 100 to 270° C. and preferably 150 to 230° C. due to the prevention of the powder from absorbing moisture and ease of collecting the powder.

The negative thermal expansion material obtained by the method for producing the negative thermal expansion material of the present invention has an average particle size of preferably 0.1 to 100 µm and particularly preferably 0.3 to 80 µm based on the observation by scanning electron microscopy. The negative thermal expansion material has BET specific surface area of 0.05 to 50 m$^2$/g µm and particularly preferably 0.1 to 10 m$^2$/g. The average particle size and the BET specific surface area of the negative thermal expansion material are preferably in the above-mentioned ranges in that in the case of using the negative thermal expansion material as a filler for resin or glass, the negative thermal expansion material is easily handled.

The particles of the negative thermal expansion material according to the present invention may be surface-treated as needed for improving the dispersibility in resin or the moisture resistance of the negative thermal expansion material. In the method for producing the negative thermal expansion material of the present invention, the negative thermal expansion material obtained by firing may be surface-treated as needed for improving the dispersibility in resin or the moisture resistance of the negative thermal expansion material.

Examples of the surface treatment include methods for coating the particle surfaces with silane coupling agents, titanate-based coupling agents, fatty acids or derivatives thereof, and inorganic compounds containing one or more elements selected from Zn, Si, Al, Ba, Ca, Mg, Ti, V, Sn, Co, Fe, and Zr (for example, refer to International Publication Nos. WO 2020/095837, WO 2020/261976, and WO 2019/087722, and Japanese Patent Laid-Open No. 2020-147486). The particles may be suitably surface-treated in combination thereof.

The coefficient of thermal expansion of the negative thermal expansion material obtained by the method for producing the negative thermal expansion material of the present invention is $-10\times10^{-6}$/K or less, preferably $-12\times10^{-6}$/K or less, and still more preferably $-15\times10^{-6}$/K or less, and the lower limit thereof is around $-40\times10^{-6}$/K or more and preferably $-37\times10^{-6}$/K or more. The coefficient of thermal expansion of the negative thermal expansion material to be obtained by the method for producing the negative thermal expansion material of the present invention is particularly preferably $-35\times10^{-6}$ to $-13\times10^{-6}$/K in that the coefficient of the negative thermal expansion material easily offsets the positive expansion upon the combination of the negative thermal expansion material of the present invention with the positive thermal expansion material.

The negative thermal expansion material of the present invention is used as powder or paste. If the negative thermal expansion material of the present invention is used as paste, the negative thermal expansion material of the present invention is mixed and dispersed in a solvent and/or a liquid resin with low viscosity for use as paste. The negative thermal expansion material of the present invention may be used as the paste by dispersing the negative thermal expansion material in a solvent and/or a liquid resin with low viscosity and further optionally adding a binder, a flux material, and a dispersant.

The negative thermal expansion material of the present invention is used in combination with various organic or inorganic compounds as the positive thermal expansion material, and the combination thereof is used as a composite material. The composite material of the present invention comprises the negative thermal expansion material and the positive thermal expansion material.

Examples of the organic compounds to be used as the positive thermal expansion material include, but not particularly limited to, rubber, polyolefin, polycycloolefin, polystyrene, ABS, polyacrylates, polyphenylene sulfide, phenolic resin, polyamide resin, polyimide resin, epoxy resin, silicone resin, polycarbonate resin, polyethylene resin, polypropylene resin, polyethylene terephthalate resin (PET resin), and polyvinyl chloride resin. Examples of the inorganic compounds to be used as the positive thermal expansion material include silicon dioxide, silicates, graphite, sapphire, various glass materials, concrete materials, and various ceramic materials.

Since the composite material of the present invention contains the negative thermal expansion material with better negative thermal expansion characteristics, a negative coefficient of thermal expansion, a zero coefficient of thermal expansion, or a low coefficient of thermal expansion can be achieved depending on the ratio of the negative thermal expansion material to another compound.

EXAMPLES

Hereinafter, the present invention will be described by Examples, but is not limited thereto.
(X-Ray Diffractor)
In Examples, measurement was performed with an X-ray diffractor (Ultima IV available from Rigaku Corporation) under the following measurement conditions:
Radiation source: Cu-Kα
Tube voltage: 40 kV
Tube current: 40 mA
Scanning rate: 4°/sec Example 1

(First Step)
A beaker was charged with 3.00 g of ammonium vanadate ($NH_4VO_3$), 6 ml of aqueous ammonia, and 80 ml of pure water, and the mixture was heated to 60° C. with stirring to obtain a solution A. Then, 11.35 g of copper gluconate (available from FUSO CHEMICAL CO., LTD.) was added to 50 ml of pure water, followed by stirring to obtain a solution B. Subsequently, 0.24 g of aluminum nitrate nonahydrate was added to 10 ml of pure water, followed by stirring to obtain a solution C. The solution B and the solution C were then added to the solution A sequentially to obtain a raw material-mixed solution as a solution in which the raw materials were dissolved.
The obtained raw material-mixed solution was heated to a temperature that enables keeping the solution boiling with stirring, and water was removed therefrom to obtain a pasty raw material mixture.
(Second Step)
The obtained pasty raw material mixture was fired in a crucible in the atmosphere at 700° C. for 4 hours to obtain a fired article.
In the X-ray diffraction analysis of the obtained fired article, detected $Cu_{2.00}V_{2.00}O_{7.00}$ with a single phase of the ziesite phase, having the main peak at around $2\theta=25°$ was detected. FIG. 1 shows the X-ray diffraction pattern of the fired article. The obtained fired article was acidolyzed to obtain a solution, and the solution was subjected to ICP emission analysis to determine the content of Al atoms in the fired article. The content of Al atoms was 3980 ppm by mass. These results showed that the fired article was a copper vanadium composite oxide with a single phase of the ziesite phase dissolving the Al atoms at 3980 ppm by mass.
The fired article was then pulverized with a mortar to obtain a negative thermal expansion material sample.
The observation of the randomly sampled fifty particles from this negative thermal expansion material sample with electron microscope (at a magnification of 400) showed that the particle shape was a crushed shape.

Example 2

Figure 2:
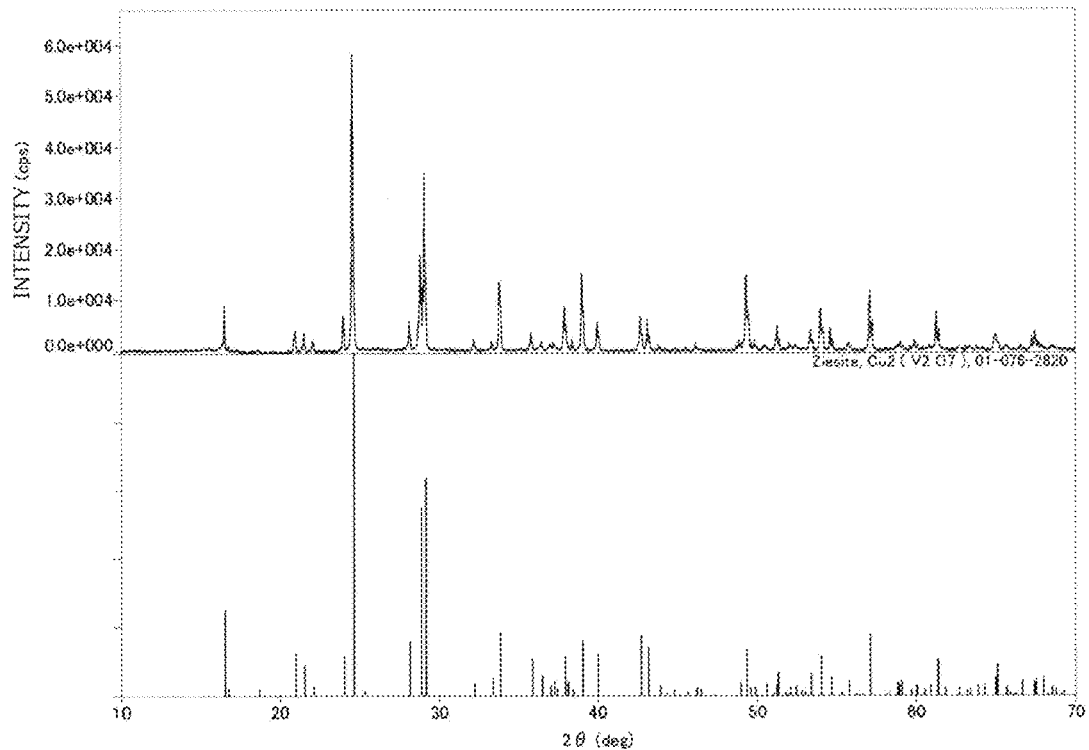
FIG. 2 is the X-ray diffraction pattern of a negative thermal expansion material sample obtained in Example 2.

(First Step)
A beaker was charged with 3.00 g of ammonium vanadate ($NH_4VO_3$), 6 ml of aqueous ammonia, and 80 ml of pure water, and the mixture was heated to 60° C. with stirring to obtain a solution A. Then, 11.06 g of copper gluconate (available from FUSO CHEMICAL CO., LTD.) was added to 50 ml of pure water, followed by stirring to obtain a solution B. Subsequently, 0.48 g of aluminum nitrate nonahydrate was added to 10 ml of pure water, followed by stirring to obtain a solution C. The solution B and the solution C were then added to the solution A sequentially to obtain a raw material-mixed solution as a solution in which the raw materials were dissolved.
The raw material-mixed solution was heated to a temperature that enables keeping the solution boiling with stirring, and water was removed therefrom to obtain a pasty reaction mixture.
(Second Step)
The pasty reaction mixture was fired in a crucible in the atmosphere at 700° C. for 4 hours to obtain a fired article.
In the X-ray diffraction analysis of the obtained fired article, $Cu_{2.00}V_{2.00}O_{7.00}$ with a single phase of the ziesite phase, having the main peak at around $2\theta=25°$ was detected. FIG. 2 shows the X-ray diffraction pattern of the fired article. The obtained fired article was acidolyzed to obtain a solution, and the solution was subjected to ICP emission analysis to determine the content of Al atoms in the fired article. The content of Al atoms was 8000 ppm by mass. These results showed that the fired article was a copper vanadium composite oxide with a single phase of the ziesite phase dissolving the Al atoms at 8000 ppm by mass.
The fired article was then pulverized with a mortar to obtain a negative thermal expansion material sample.
The observation of the randomly sampled fifty particles from this negative thermal expansion material sample with electron microscope (at a magnification of 400) showed that the particle shape was a crushed shape.

Example 3

Figure 3:
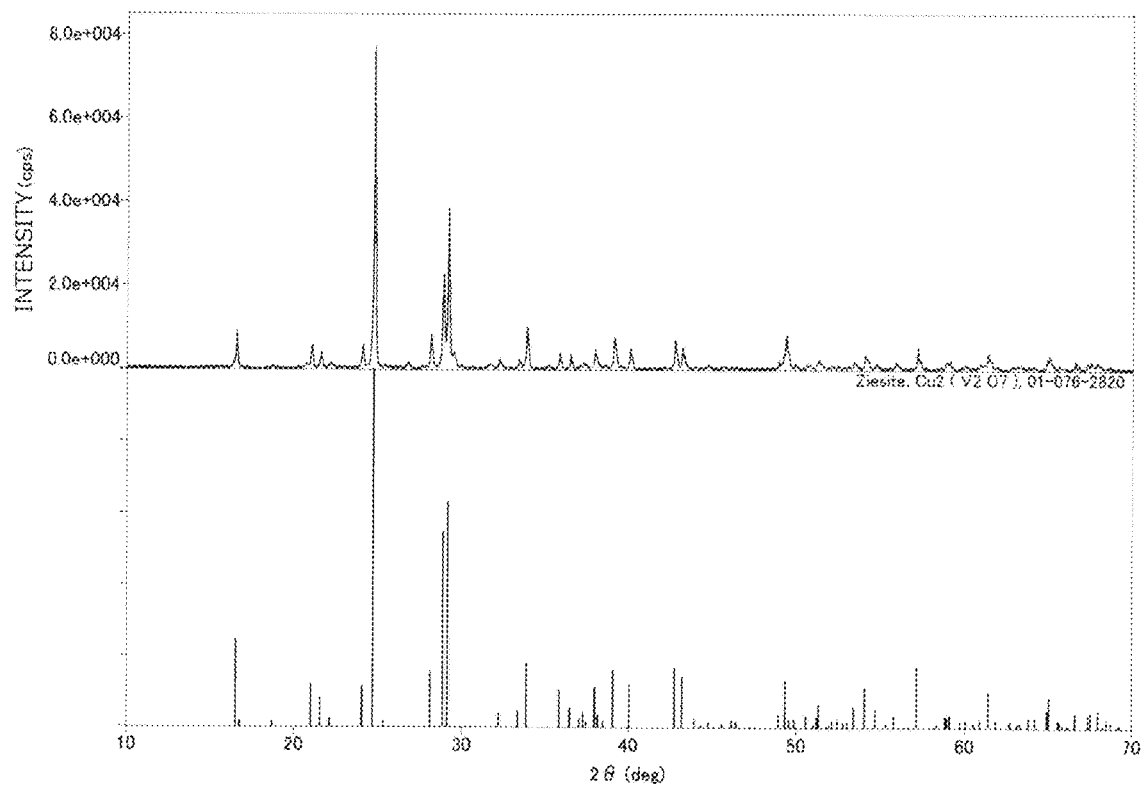
FIG. 3 is the X-ray diffraction pattern of a negative thermal expansion material sample obtained in Example 3.

(First Step)
A beaker was charged with 3.00 g of ammonium vanadate ($NH_4VO_3$), 6 ml of aqueous ammonia, and 80 ml of pure water, and the mixture was heated to 60° C. with stirring to obtain a solution A. Then, 10.19 g of copper gluconate (available from FUSO CHEMICAL CO., LTD.) was added to 50 ml of pure water, followed by stirring to obtain a solution B. Subsequently, 1.20 g of aluminum nitrate nonahydrate was added to 20 ml of pure water, followed by stirring to obtain a solution C. The solution B and the solution C were then added to the solution A sequentially to obtain a raw material-mixed solution as a solution in which the raw materials were dissolved.
The raw material-mixed solution was heated to a temperature that enables keeping the solution boiling with stirring, and water was removed therefrom to obtain a pasty raw material mixture.
(Second Step)
The pasty raw material mixture was fired in a crucible in the atmosphere at 700° C. for 4 hours to obtain a fired article.
In the X-ray diffraction analysis of the obtained fired article, $Cu_{2.00}V_{2.00}O_{7.00}$ with a single phase of the ziesite phase, having the main peak at around $2\theta=25°$ was detected. FIG. 3 shows the X-ray diffraction pattern of the fired article. The obtained fired article was acidolyzed to obtain a solution, and the solution was subjected to ICP emission analysis to determine the content of Al atoms in the fired article. The content of Al atoms was 20330 ppm by mass. These results showed that the fired article was a copper vanadium composite oxide with a single phase of the ziesite phase dissolving the Al atoms at 20330 ppm by mass.

The fired article was then pulverized with a mortar to obtain a negative thermal expansion material sample.

The observation of the randomly sampled fifty particles from this negative thermal expansion material sample with electron microscope (at a magnification of 400) showed that the particle shape was a crushed shape.

Comparative Example 1

First, 1.71 g of vanadium pentoxide ($V_2O_5$: average particle size: 1.0 µm), 1.50 g of copper oxide (CuO: average particle size: 1.5 µm), and 30 ml of ethanol were pulverized and mixed as a dispersion medium with a mortar for 20 minutes, then dried to obtain a raw material mixture. This powder was fired in the atmosphere at 650° C. for 4 hours to obtain a fired article.

Figure 4:
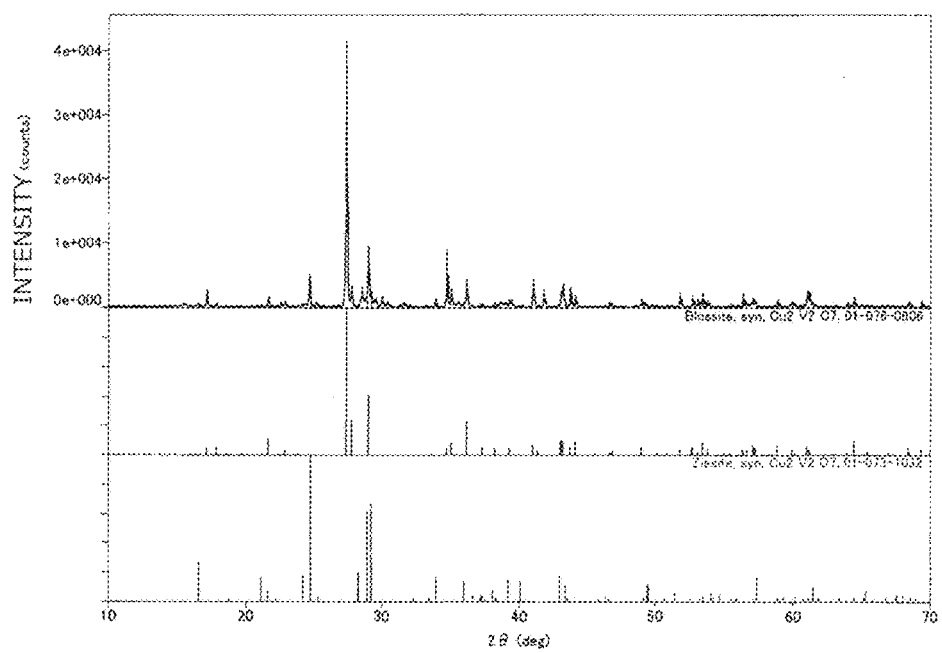
FIG. 4 is the X-ray diffraction pattern of a negative thermal expansion material sample obtained in Comparative Example 1.

In the X-ray diffraction analysis of the obtained fired article, $Cu_{2.00}V_{2.00}O_{7.00}$ with a single phase of the blossite phase, having the main peak at around $2\theta=27°$ was detected. FIG. 4 shows the X-ray diffraction pattern of the fired article.

That is, in Comparative Example 1, any Al sources are not used, and any Al atoms are not dissolved in the obtained copper vanadium composite oxide as $Cu_2V_2O_7$.

The fired article was then pulverized with a mortar to obtain a negative thermal expansion material sample.

The observation of the randomly sampled fifty particles from this negative thermal expansion material sample with electron microscope (at a magnification of 400) showed that the particle shape was a crushed shape.

(Physical Properties Evaluation)

The negative thermal expansion material samples obtained in Examples and Comparative Example were measured for average particle size, BET specific surface area, and the coefficient of thermal expansion. The average particle sizes and the coefficients of thermal expansion were measured as follows. Table 1 shows the results thereof.

(Average Particle Size)

Each negative thermal expansion material sample was observed through a scanning electron microscope at a magnification of 1000. The longest diameters of 50 particles randomly sampled from the observation visual field were measured to calculate the arithmetic mean value thereof as the average particle size of the negative thermal expansion material sample.

(Measurement of Coefficient of Thermal Expansion)
<Manufacturing of Molding>

To 1.00 g of a sample was added 0.05 g of propylene carbonate, and the mixture was pulverized and mixed with a mortar for 3 minutes. Then, 0.15 g thereof was weighed, and the whole amount thereof was filled into a metal mold with a diameter of 6 mm and subsequently molded with a hand press at a pressure of 0.5 t to manufacture a powder molding. The temperature of the obtained powder molding was raised to 700° C. over 3 hours and held for 4 hours with an electric furnace to manufacture a ceramic molding.
<Measurement of Coefficient of Thermal Expansion>

The manufactured ceramic molding was measured for the coefficient of thermal expansion with a thermomechanical measuring apparatus (TMA4000SE available from NETZSCH Japan K.K.). The measurement was repeated twice under the measurement conditions of a nitrogen atmosphere, a load of 10 g, and a temperature range of 50 to 425° C. The coefficient of thermal expansion at 50 to 400° C. of the second repeated measurement was defined as the coefficient of thermal expansion of the negative thermal expansion material sample.

TABLE 1

| | Al atom content (ppm by mass) | Average particle size (µm) | BET specific surface area (m²/g) | Coefficient of thermal expansion (×10⁻⁶/K) |
|---|---|---|---|---|
| Example 1 | 3980 | 19 | 0.3 | −20.1 |
| Example 2 | 8000 | 19 | 0.3 | −21.7 |
| Example 3 | 20330 | 17 | 0.4 | −13.2 |
| Comparative Example 1 | 0 | 18 | 0.4 | −2.3 |

Note that the coefficient of thermal expansion of the negative thermal expansion material sample in Comparative Example 1 at 50 to 300° C. was $-4.4\times10^{-6}$/K.

Example 4

First, 16.2 parts by mass of vanadium pentoxide ($V_2O_5$: average particle size: 1.0 µm), 13.5 parts by mass of copper oxide (CuO: average particle size: 1.5 µm), and 0.5 parts by mass of aluminum hydroxide ($Al(OH)_3$: average particle size: (1.2) µm) were weighed and added to 69.7 parts by mass of pure water as a dispersion medium, followed by stirring for 30 minutes to prepare 30.2% by mass slurry.

To the slurry was then added 0.1 parts by mass of ammonium polycarboxylate as a dispersant. Zirconia beads with a diameter of 0.5 mm were added to the slurry with stirring. The slurry was fed to a medium stirring bead mill, followed by wet pulverization. The average particle size of the solid matter after the wet pulverization was determined as 0.54 µm by laser diffraction/scattering.

The slurry after the wet pulverization was then fed to a spray dryer set at 220° C. at a rate of 3.3 L/h, followed by spray drying to obtain a raw material mixture.

The raw material mixture was then fired in the atmosphere at 700° C. for 4 hours to obtain a fired article. In the X-ray diffraction analysis of the obtained fired article, $Cu_{2.00}V_{2.00}O_{7.00}$ with a single phase of the ziesite phase, having the main peak at around $2\theta=25°$ was detected. The obtained fired article was acidolyzed to obtain a solution, and the solution was subjected to ICP emission analysis to determine the content of Al atoms in the fired article. The content of Al atoms was 5600 ppm by mass. These results showed that the fired article was a copper vanadium composite oxide with a single phase of the ziesite phase dissolving the Al atoms at 5600 ppm by mass.

The fired article was pulverized with a mortar and then pulverized with a jet mill to obtain a pulverized material. This was considered to be a negative thermal expansion material sample.

The observation of the randomly sampled fifty particles from this negative thermal expansion material sample with electron microscope (at a magnification of 400) showed that the particle shape was spherical.

Example 5

The same procedure as Example 4 was performed to obtain a pulverized material except that the raw material mixture was fired at 650° C.

The X-ray diffraction analysis of the obtained fired article detected a single phase of the copper vanadium composite oxide ($Cu_{2.00}V_{2.00}O_{7.00}$), and the single phase had the main diffraction peak derived from the ziesite phase at around 2θ=25°. A diffraction peak derived from the blossite phase was also observed at around 2θ=27°. This was obtained as a negative thermal expansion material dissolving Al atoms at 5600 ppm by mass.

The observation of the randomly sampled fifty particles from this negative thermal expansion material sample with electron microscope (at a magnification of 400) showed that the particle shape was spherical.

Example 6

First, 16.2 parts by mass of vanadium pentoxide ($V_2O_5$: average particle size: 1.0 μm), 13.4 parts by mass of copper oxide (CuO: average particle size: 1.5 μm), 0.5 parts by mass of aluminum hydroxide ($Al(OH)_3$: average particle size: 1.2 μm), and 0.2 parts by mass of calcium carbonate ($CaCO_3$: average particle size: 2.4 μm) were weighed and added to 69.7 parts by mass of pure water as a dispersion medium, followed by stirring for 30 minutes to prepare 30.3% by mass slurry.

To the slurry was then added 0.1 parts by mass of ammonium polycarboxylate as a dispersant. Zirconia beads with a diameter of 0.5 mm were added to the slurry with stirring. The slurry was fed to a medium stirring bead mill, followed by wet pulverization. The average particle size of the solid matter after the wet pulverization was determined as 0.52 μm by laser diffraction/scattering.

The slurry after the wet pulverization was then fed to a spray dryer set at 220° C. at a rate of 3.3 L/h, followed by spray drying to obtain a raw material mixture.

The raw material mixture was then fired in the atmosphere at 700° C. for 4 hours to obtain a fired article. In the X-ray diffraction analysis of the obtained fired article, $Cu_{2.00}V_{2.00}O_{7.00}$ with a single phase of the ziesite phase, having the main peak at around 2θ=25° was detected. The obtained fired article was acidolyzed to obtain a solution, and the solution was subjected to ICP emission analysis to determine the content of Al atoms in the fired article. The content of Al atoms was 5600 ppm by mass. These results showed that the fired article was a copper vanadium composite oxide ($Cu_{1.98}Ca_{0.02}V_{2.00}O_{7.00}$) with a single phase of the ziesite phase dissolving the Al atoms at 5600 ppm by mass.

The fired article was then pulverized with a mortar and subsequently pulverized with a jet mill to obtain a pulverized material. This was considered to be a negative thermal expansion material sample.

The observation of the randomly sampled fifty particles from this negative thermal expansion material sample with electron microscope (at a magnification of 400) showed that the particle shape was spherical.

(Physical Properties Evaluation)

Figure 5:
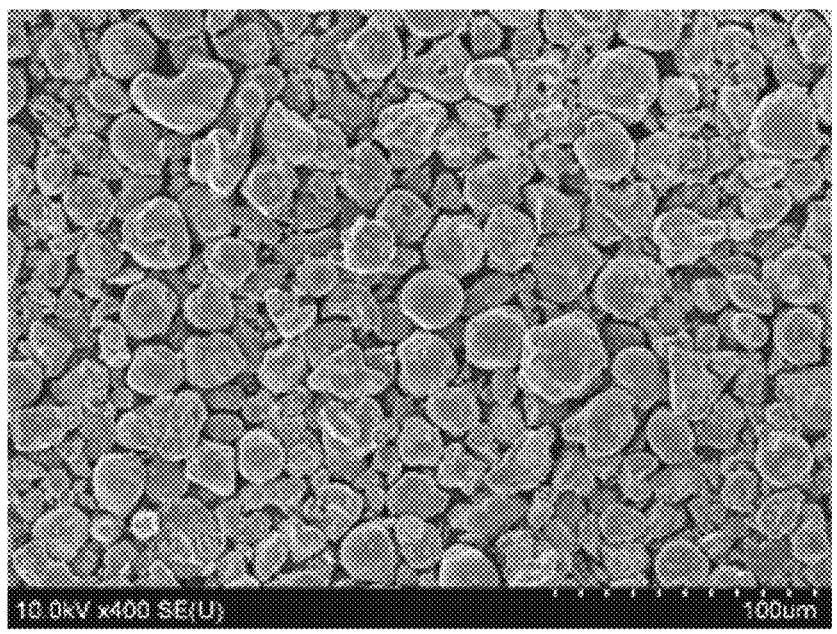
FIG. 5 is a SEM photograph of a negative thermal expansion material sample obtained in Example 4 (at a magnification of 400).

Each of the negative thermal expansion material samples obtained in Examples 4, 5, and 6 was measured for average particle size, BET specific surface area, and the coefficient of thermal expansion in the same way as in Examples 1 to 3. The content of spherical particles was determined by the following method. FIG. 5 shows an SEM photograph of the negative thermal expansion material sample obtained in Example 4.

(Measurement of Spherical Particle Content)

The sphericities of 50 particles randomly sampled at a magnification of 400 were determined with the image analyzer LUZEX (available from NIRECO CORPORATION) in accordance with the following calculation expression. The content of spherical particles with sphericities of 0.70 or more and 1.00 or less based on the number was evaluated.

Sphericity=diameter equivalent to diameter of circle with equal area/circumscribed circle diameter Diameter equivalent to diameter of circle with equal area: the diameter of a circle having a circumference that is equivalent to the perimeter of a particle Circumscribed circle diameter: longest diameter of the particle

TABLE 2

| | Average particle size (μm) | BET specific surface area (m²/g) | Content of spherical particles (%) | Coefficient of thermal expansion (×10⁻⁶/K) |
|---|---|---|---|---|
| Example 4 | 22 | 0.37 | 90 | −15.6 |
| Example 5 | 21 | 0.19 | 91 | −22.9 |
| Example 6 | 25 | 0.38 | 90 | −15.7 |

Although the negative thermal expansion material sample of Example 5 and the negative thermal expansion material of Example 4 contained the Al atoms at the same content, the negative thermal expansion material sample of Example 5, fired at 650° C., was better in negative thermal expandability as compared with the negative thermal expansion material of Example 4, fired at 700° C. It is conceivable that this is because, in the negative thermal expansion material sample of Example 5, the conversion of the blossite phase into the ziesite phase in the copper vanadium composite oxide is promoted, and further growth of each particle reduces the gaps between the particles in the ceramic molding itself still further during the firing at 700° C. for preparing the ceramic molding to be measured for the coefficient of thermal expansion, so that the ceramic molding prepared from the negative thermal expansion material of Example 5, which is denser than the ceramic molding prepared from the negative thermal expansion material of Example 4, is obtained.

The invention claimed is:

1. A negative thermal expansion material, comprising copper vanadium composite oxide powder dissolving Al atoms at a content of 1000 to 26000 ppm by mass and represented by the following general formula (1):

$$Cu_xM_yV_zO_t \quad (1)$$

wherein M represents a metallic element with an atomic number of 11 or more other than Cu, V, and Al, 1.60≤x≤2.40, 0.00≤y≤0.40, 1.70≤z≤2.30, 6.00≤t≤9.00, 1.60≤x+y≤2.80, and a molar number of the Al atoms in terms of atoms>a molar number of M atoms in terms of atoms if an M element is contained, wherein the copper vanadium composite oxide powder has a crystal structure with a single phase of a ziesite phase (β-phase) or with a mixed phase of a ziesite phase (β-phase) and a blossite phase (α-phase).

2. The negative thermal expansion material according to claim 1, wherein M in the general formula (1) is one or more metallic elements selected from Zn, Ga, Fe, Mg, Co, Mn, Ba, and Ca.

3. The negative thermal expansion material according to claim 1, wherein M in the general formula (1) is Ca.

4. The negative thermal expansion material according to claim 1, wherein a coefficient of thermal expansion is −10×10⁻⁶/K or less.

5. The negative thermal expansion material according to claim 1, wherein an average particle size is 0.1 to 100 μm.

6. The negative thermal expansion material according to claim 1, wherein BET specific surface area is 0.05 to 50 m²/g.

7. The negative thermal expansion material according to claim 1, wherein a content of spherical particles with a sphericity of 0.7 or more and 1.0 or less is 75% or more based on the number.

8. A method for producing the negative thermal expansion material according to claim 1 comprising copper vanadium composite oxide powder, comprising:
- a first step of mixing an Al source, a Cu source, and a V source; and an M source to be added as needed to prepare a raw material mixture and
- a second step of firing the raw material mixture to obtain a negative thermal expansion material.

9. The method for producing the negative thermal expansion material according to claim 8, wherein the first step comprises a step of preparing a raw material-mixed solution in which the Al source, the Cu source, and the V source; and the M source to be added as needed are dissolved in a water solvent.

10. The method for producing the negative thermal expansion material according to claim 8, wherein, in the first step, slurry comprising the Al source, the Cu source, and the V source; and the M source to be added as needed is prepared, and the slurry is dried by spray drying.

11. A composite material, comprising the negative thermal expansion material according to claim 1 and a positive thermal expansion material.

12. The composite material according to claim 11, wherein the positive thermal expansion material is at least one selected from metals, alloys, glasses, ceramics, rubbers, and resins.

* * * * *